March 16, 1926.
1,577,336
F. MARSDEN
METHOD AND APPARATUS FOR MAKING EXTRUDED CLAY ARTICLES
Filed Dec. 21, 1925
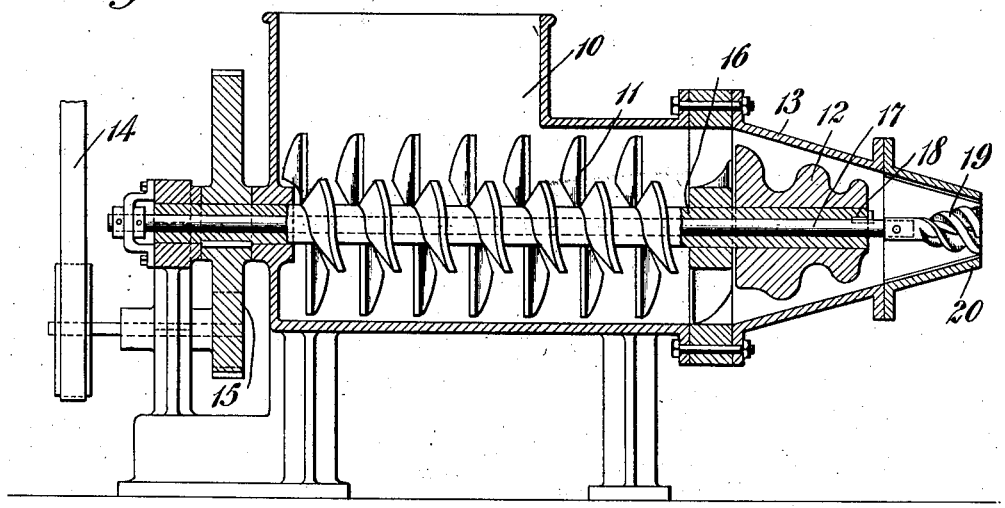
Fig:1.
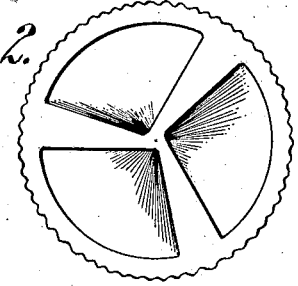
Fig:2.
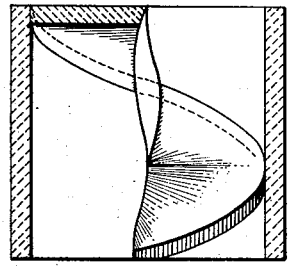
Fig:3.
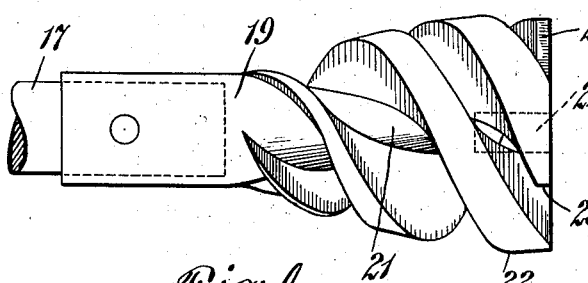
Fig:4.
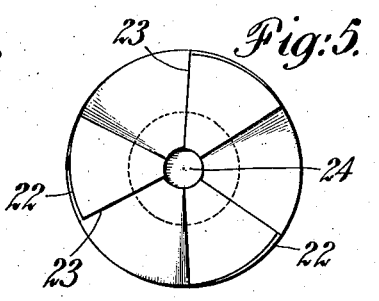
Fig:5.
INVENTOR
Firth Marsden
BY
Murrell E Clark
ATTORNEY Patented Mar. 16, 1926.

1,577,336

UNITED STATES PATENT OFFICE.

FIRTH MARSDEN, OF RAGLAND, ALABAMA, ASSIGNOR TO ALPHONS CUSTODIS CHIMNEY CONSTRUCTION COMPANY, OF NEW YORK, N. Y., A CORPORATION OF NEW JERSEY.

METHOD AND APPARATUS FOR MAKING EXTRUDED CLAY ARTICLES.

Application filed December 21, 1925. Serial No. 76,629.

*To all whom it may concern:*

Be it known that I, FIRTH MARSDEN, a subject of the King of Great Britain, and a resident of Ragland, in the county of St. Clair and State of Alabama, have invented new and useful Improvements in Methods and Apparatus for Making Extruded Clay Articles, of which the following is a specification.

This invention relates to a method and apparatus for making extruded clay articles and particularly such articles having a cylindrical or prismatic shell with warped radial partitions which radiate from the central axis of the shell. By a radial partition is meant a continuous wall extending from the central axis of the shell to the interior face of the shell. The warped surfaces of the partitions are usually helicoidal in shape. The extruded shapes after firing in a kiln become hollow tiles.

The main object of this invention is to provide a method and apparatus which will make possible the economical and continuous manufacture of such tiles. Other objects will become apparent hereinafter.

In carrying out my invention the clay of which the tile is to be made is extruded between an outer die and a rotating inner, or core, die. This inner die has a general resemblance to an auger. But, as will hereinafter appear, the blades of this auger are so shaped, and the auger itself is so designed, that the helicoidal walls of the tile as initially formed do not extend quite to the axis of the tile, but leave a cylindrical axial void at the center. The final action of the dies on the tile, however, causes each of the several walls to be extended to, or even slightly beyond, the axis, with the result that their inner edges are joined together and the void is eliminated.

As will appear more fully when the inner die is described in detail, the design of that die not only makes possible the manufacture of tile of the character above described, but also eliminates all danger of clogging and thus renders such manufacture highly successful.

In the drawing, Fig. 1 is a vertical longitudinal section of one form of machine for carrying out my invention; Fig. 2 is an end view of one of a tile produced in accordance with my invention; Fig. 3 is a fragmentary longitudinal sectional view, showing (for the sake of clearness) only one of the partitions; Fig. 4 is an elevation of the inner or core tile forming die; and Fig. 5 is an end view of that die.

Any well known form of clay extruding machine, such for example as that indicated in Fig. 1, may be employed in carrying out my invention. The particular extruding machine illustrated consists of a hopper 10 for receiving the clay, propelling blades 11 for propelling the clay along, and a double winged auger 12 located within the conical shaped chamber 13.

This auger 12, which should be distinguished from the inner or core die to which I have already referred, is the immediate means of forcing the clay through the dies. Any suitable means, such as indicated at 14, 15 may be employed for actuating the hollow shaft 16 upon which the propeller blades 11 and auger 12 are mounted. Within this hollow shaft 16 is preferably mounted the shaft 17, keyed to it as indicated at 18. Upon the forward end of this shaft 17 is mounted the auger-shaped inner die 19 within the outer die 20. This outer die 20, the inner surface of which is preferably corrugated in order to give the desired corrugations to the outer surface of the tile to be formed, may be cylindrical in cross-section or polygonal as desired.

The general method of operation of the machine will be readily understood from the foregoing, involving as it does merely the forcing of the clay out through the discharge end of the machine between the outer die 20 and the revolving inner die 19. It is to the particular form and function of this inner die 19 that I wish to direct special attention.

As shown in Fig. 4, this die 19 is provided with three helicoidal blades, it being understood, of course, that the number of blades may be varied as desired. The axial post of the die, which I have marked 21, decreases in diameter toward the forward end. Each blade starts at nothing at the rear of the die and increases in diameter toward the front until it reaches a diameter equal to the desired inner diameter of the tile which is to be formed. As will be apparent from an examination of Figs. 4 and 5, this maximum diameter of the blades of the die is reached not at the front end of the die but at a short distance back of the front end, as indicated for example at 22 in Fig. 4. From this point forward each blade decreases slightly in diameter, the purpose of this decrease being to relieve slightly the pressure upon the clay pressed between the two dies and thus facilitate the extrusion of the tile that is formed.

To further facilitate this extrusion each of the blades, upon reaching the forward end, is cut off as indicated at 23 of Fig. 4, thus freeing the clay walls which have been formed from obstruction at the point of discharge.

It is of course obvious that unless some provision such as I am about to describe were made, a tile extruded from a device of this character would have a cylindrical axial void. Such a void would be undesirable in tile intended for certain uses where, for example, it is desired that substantially all of the gases passing therethrough shall take a circuitous path. I have found that this void may be eliminated by providing a cylindrical axial hole in the end of the inner die, as indicated at 24 in Figs. 4 and 5. The result of providing this hole is that as the clay walls which are formed in the constantly narrowing paths between the blades of the die reach the region of this hole they are elongated radially toward the axis until they overlap and come together. In this way the void which would otherwise be formed and which existed before the region of the hole was reached, is entirely eliminated.

Fig. 2 is an end view showing one of the tiles made in accordance with my invention. This tile, it will be noted, includes no central void and therefore substantially all of the gases passing through it must take a circuitous path. In Fig. 3 is shown the course taken by one of the helicoidal clay walls of the tile. I have shown but one wall in this figure in order to avoid confusion. It is understood, however, that all of the walls at their respective positions follow similar courses.

The manner in which tiles are formed under my invention is believed to be clear from the description which I have given above. A brief résumé may, however, be helpful. Referring to Figs. 1 and 4, as the clay reaches the point of the auger or die 19 where the blades begin, it is taken over by the blades and advanced by them. As has been suggested, the blades increase in diameter and in thickness toward the front so that the paths between blades in which the walls of the tile protrude decrease in thickness as they increase in diameter. This decrease in thickness results in part also, and may result wholly, from a varying of the pitch of the blades. The result is that as the clay passes through these paths it gradually changes from the form of thick walls of relatively small diameter to thin walls of relatively large diameter. And as above explained, just before it reaches the end of the die these walls are extended inwardly to the axis. The outer shell or periphery, which will correspond in shape with the inner surface of the outer die 20, will, of course, be formed simultaneously with the formation of the helicoidal walls and integral with those walls. The reverse tapering of the forward end of the inner die and the cutting away of the blades as described above readily facilitate the discharge of the product.

The shape of the blades on the revolving inner die should be such as to transmit the proper velocity to the clay throughout its mass. It is essential that the clay spirals move at substantially the same velocity as the clay which forms the shell. Otherwise the spirals might be sheared from the shell, or if not sheared, become laminated and form cracks in the extruded shape.

It is understood that where I have used such geometric terms as cylindrical, helicoidal and the like, I intend those words as covering shapes having those general characteristics, since it is difficult in work on this kind to produce exact geometric shapes. It is also understood that after the clay product has been extruded from the machine it will be cut into lengths as desired and fired in a tile kiln. These steps, however, form no part of my present invention and therefore I have not described them in detail.

The terms and expressions which I have employed are used as terms of description and not of limitation, and I have no intention, in the use of such terms and expressions, of excluding any mechanical equivalent of the features shown and described, or portions thereof, but recognize that various modifications are possible within the scope of the invention claimed.

What I claim is:

1. The method of making an integral clay article having an outer shell and helicoidal partitions within it, which consists in forming the shell, and simultaneously forming the partitions integral with the shell and with their inner edges free, and then extending the partitions inwardly so that their inner free edges join.

2. A machine for forming extruded clay articles which consists of an outer die and inner die and means for forcing clay between said dies and for revolving said inner die, said inner die being provided with a plurality of helicoidal spirals and with a central axial recess in the discharge end thereof for the purpose described.

3. A machine such as described in claim 2, in which the helicoidal spirals of the inner die increase in diameter toward the discharge end up to a point slightly before that end is reached, and from there on decrease slightly in diameter.

4. A machine such as described in claim 2, in which the helicoidal spirals are cut off in an axial direction at the discharge end to permit the unobstructed discharge of the article.

FIRTH MARSDEN.